United States Patent [19]

Tynan

[11] 4,131,371

[45] Dec. 26, 1978

[54] CO-ROTATING MULTIPLE SCREW PROCESSOR

[75] Inventor: Daniel G. Tynan, Wilmington, Del.

[73] Assignee: E. I. Du Pont de Nemours and Company, Wilmington, Del.

[21] Appl. No.: 822,999

[22] Filed: Aug. 3, 1977

[51] Int. Cl.² .................................................. B01F 7/00
[52] U.S. Cl. ..................................................... 366/301
[58] Field of Search ........................... 366/301, 292, 297

[56] References Cited

U.S. PATENT DOCUMENTS

| | | | |
|---|---|---|---|
| 2,814,472 | 11/1957 | Erdmenger | 366/301 |
| 3,195,868 | 7/1965 | Loomans | 366/301 |
| 3,423,074 | 1/1969 | Loomans | 366/301 |
| 3,446,485 | 5/1969 | Fischer | 366/301 |
| 3,717,330 | 2/1973 | Pinney | 366/301 |

*Primary Examiner*—Edward J. McCarthy

[57] ABSTRACT

This invention relates to a screw processor having multiple fully intermeshed co-rotating in-phase screws each provided with equal numbers of threads, each of said screws having longitudinally staged eccentric cross-sections preselected so that at least one thread of each screw spreads process material over the barrel bore and at least one other thread of each screw collects said process material and transfers it to a co-acting screw, which thereupon repeats the spreading-collecting-transfer cycle.

7 Claims, 27 Drawing Figures

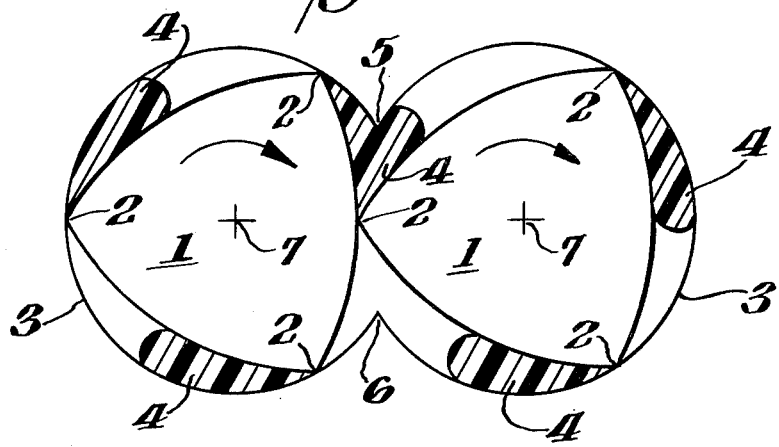
Fig.1.
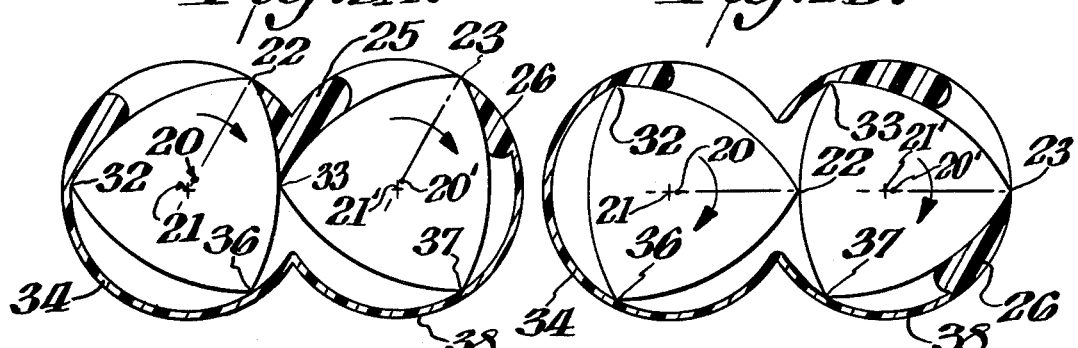
Fig.2A. Fig.2B.
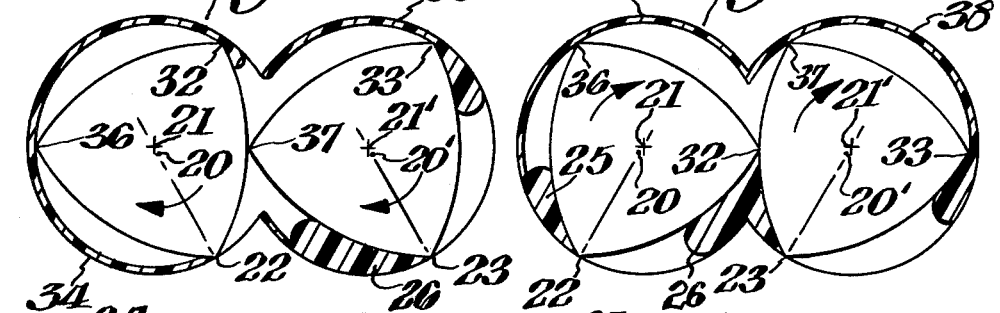
Fig.2C. Fig.2D.
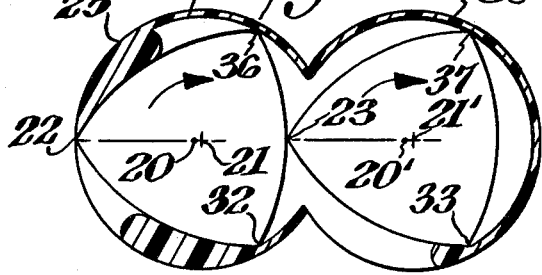 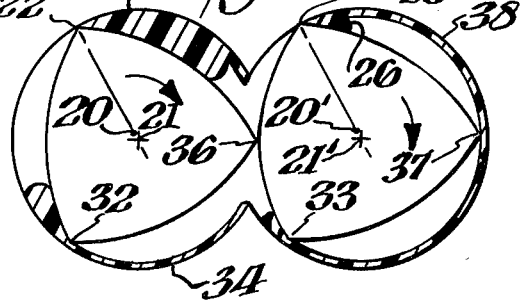
Fig.2E. Fig.2F.

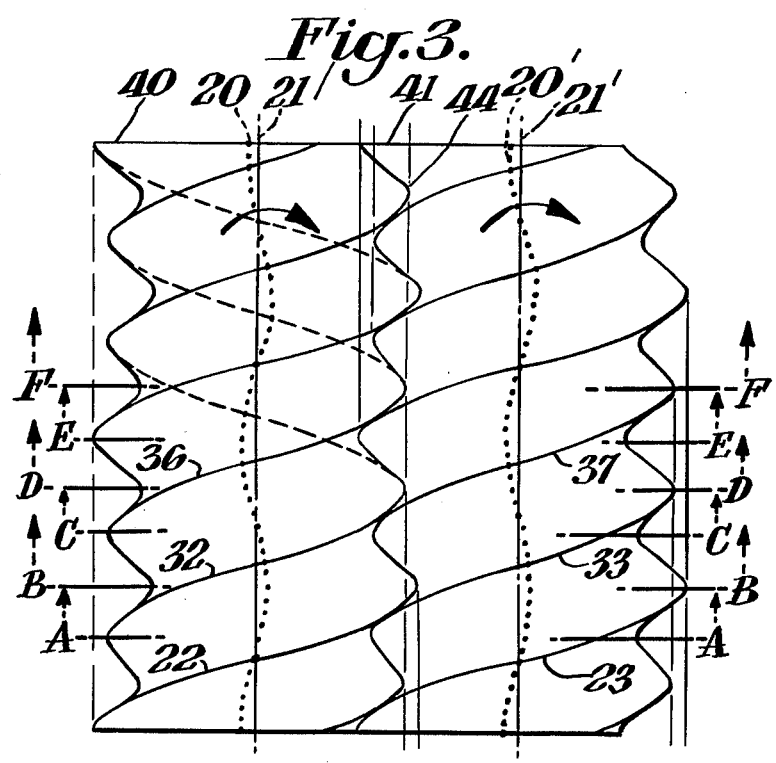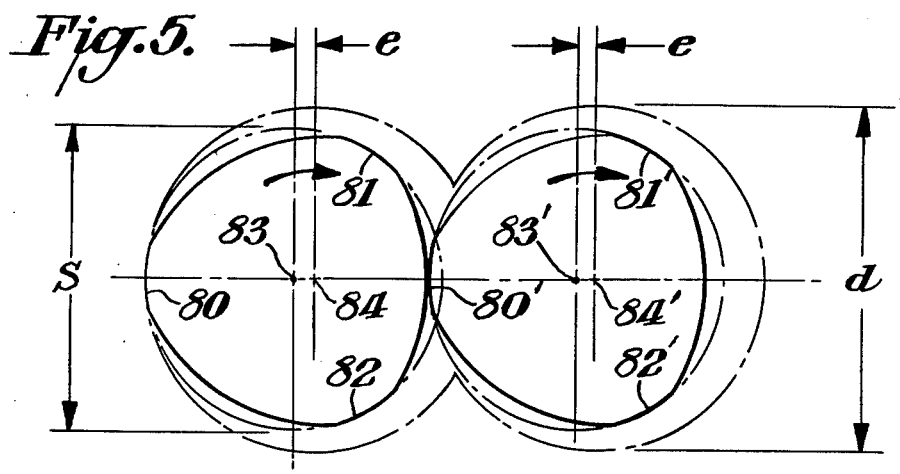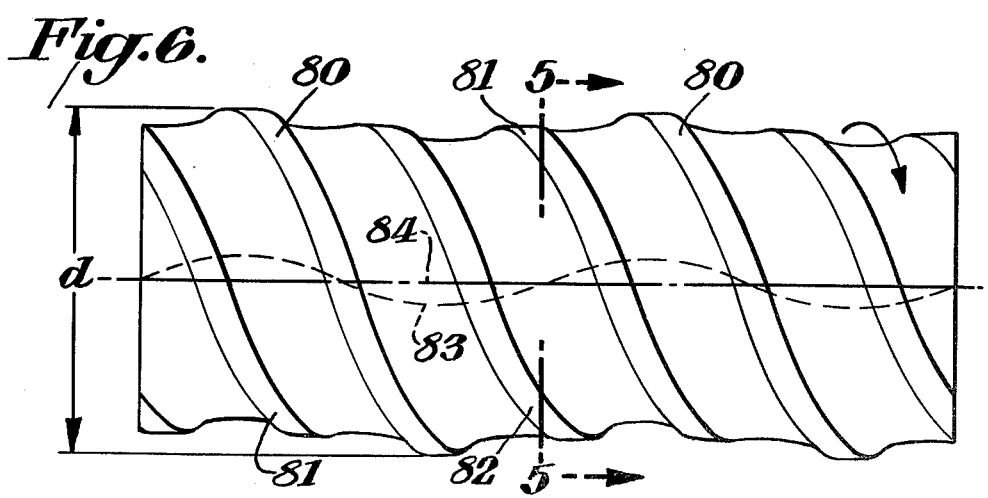

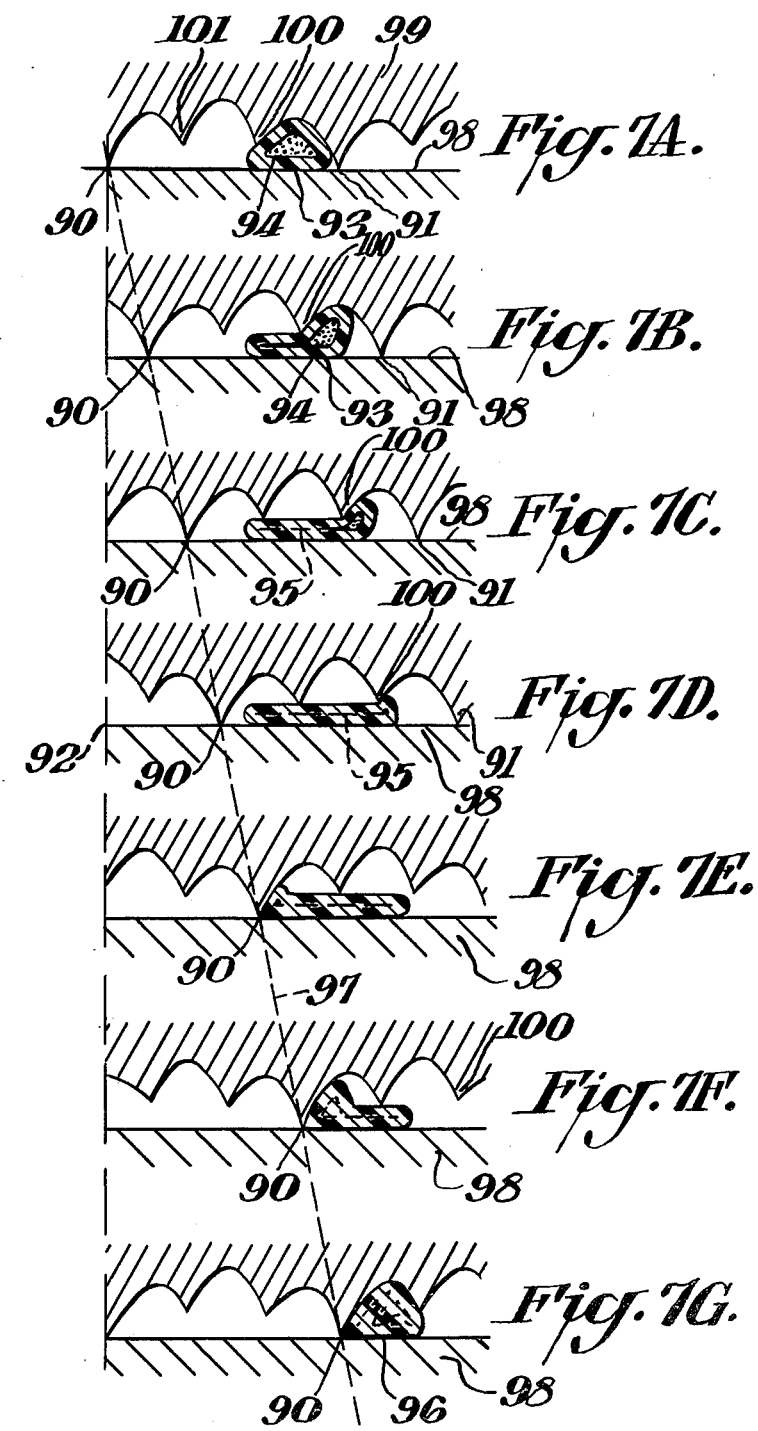

CO-ROTATING MULTIPLE SCREW PROCESSOR

BACKGROUND OF THE INVENTION

In the manufacture or processing of viscous materials, such as polymers and other relatively high viscosity substances, it is frequently advantageous to subject the material to reaction, heating, devolatilizing, intimate mixing to achieve uniformity of composition, melt plasticating and the like and, sometimes, to conduct more than one of these operations simultaneously or consecutively in a single apparatus.

Very often the capacity of the processor is determined by the heat transfer or mass transfer to or from the material in process. This material generally moves in rope form advanced by a screw tip as it progresses along the bore wall. It is advantageous to repetitively spread the material and thereafter collect it to provide more surface area for heat and mass transfer while, periodically, subjecting the material to intensive shearing action.

There exists apparatus in the prior art employing eccentrically mounted co-rotating screws; however, these do not treat material in process uniformly. Thus, U.S. Pat. No. 3,288,077 discloses co-rotating screws which are eccentrically mounted, as distinguished from the screws themselves being eccentric in cross-section, which do wipe each other, but there is no screw flight in contact with the bore wall throughout its entire length. Consequently, portions of the bore are not wiped and there is not a uniform treatment of material through the bore as is achieved by this invention.

U.S. Pat. No. 3,717,330 discloses a fully-wiped double cone device in which both the screw elements and the bore walls are fully wiped. However, there is no teaching of multiple tip screws in which one or more of the tips is reserved to spreading the material and thus does not wipe the wall at all.

BRIEF SUMMARY OF THE INVENTION

This invention constitutes a screw material processor embodying a multiplicity of fully intermeshed corotating in-phase screws each provided with equal numbers of threads, which threads comprise at least a first thread cut along a first helix in sliding contact with the bore of the processor housing with longitudinal axis coincident with the axis of rotation of the screw and at least one additional thread of reduced crest radius as compared with said first thread cut along a helical course concentric with the axis of rotation, said screws having longitudinally staged eccentric cross-sections the geometric centers of which lie on a helical curve having its longitudinal axis concentric with the axis of rotation, the amplitude of which helical curve is preselected to provide clearance of the additional thread with respect to the processor bore for spreading process material.

THE DRAWINGS

As regards the drawings, in which cross-hatching is omitted on all transverse cross-sections in the interests of clarity of representation:

FIG. 1 is a schematic transverse sectional representation of a conventional twin screw processor each screw of which has three tips, all of which wipe the walls of the apparatus bore, FIGS. 2A-2F are schematic longitudinally staged transverse sectional representations of a twin screw, three-tipped processor according to this invention wherein two tips of each screw spread material in process and the remaining tip wipes the bore wall to collect the process material and transfer it to the co-acting screw for repetition of the cycle, the showing of the viscous loading being that observed for a single preselected cross-section as distinguished from successive screw cross-sections.

FIG. 3 is a plan view of a length of the screws of FIGS. 2A-2F indicating, by corresponding alphabetic letters, the transverse planes corresponding to the transverse sections along which FIGS. 2A-2F, respectively, are taken, FIGS. 4A-4H are schematic longitudinally staged transverse sectional representations of a twin screw, two-tipped processor wherein one tip of each screw spreads material in process whereas the remaining tip wipes the bore wall to collect the process material and transfer it to the co-acting screw for repetition of the cycle, the showing of the loading being that observed for a single preselected cross-section as distinguished from successive screw cross-sections, FIG. 5 is a schematic transverse sectional view of a preferred embodiment of the apparatus of FIGS. 2A-2F wherein the thread tips are shaped to provide extended arcuate working surfaces, FIG. 6 is a longitudinal side elevation view of the apparatus of FIG. 5, FIGS. 7A-7G are schematic localized longitudinal sections taken along the bore wall of a short length of one screw of a twin screw three-tipped processor according to this invention detailing the progressive spreading, mixing and consolidation of a small amount of viscous material in process, FIG. 8 is a schematic transverse sectional view of a twin screw two-tipped apparatus according to this invention embodying screws of different cross-sectional area and FIG. 9 is a schematic transverse sectional view of a three screw, two-tipped apparatus according to this invention wherein the central screw has a different cross-sectional area than either of the identical planetary screw pair.

DETAILED DESCRIPTION

Figure 4A:
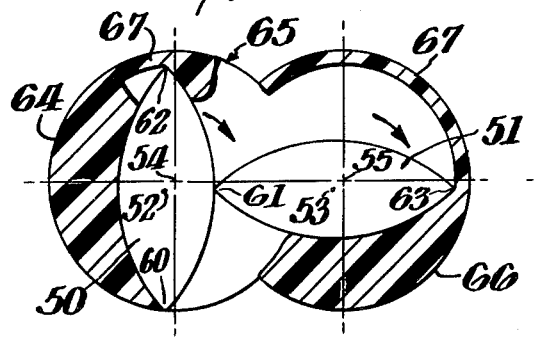
Figure 4B:
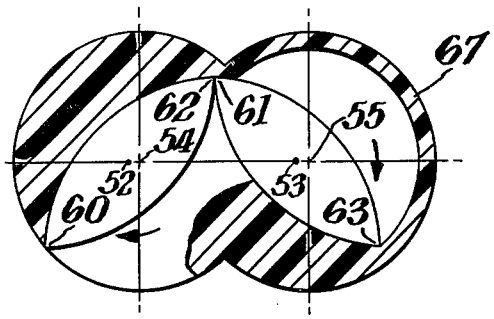
Figure 4C:
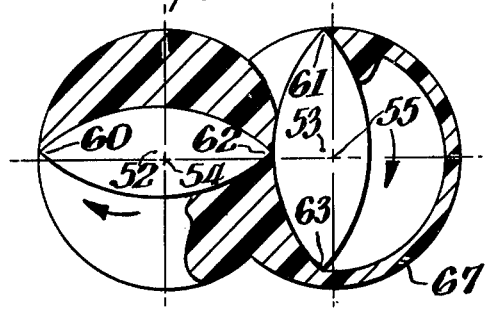
Figure 4D:
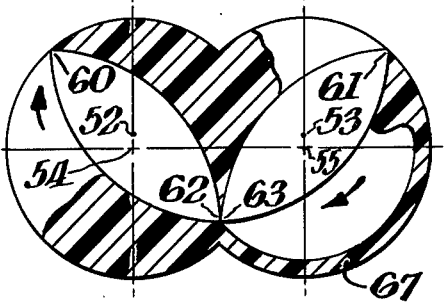
Figure 4E:
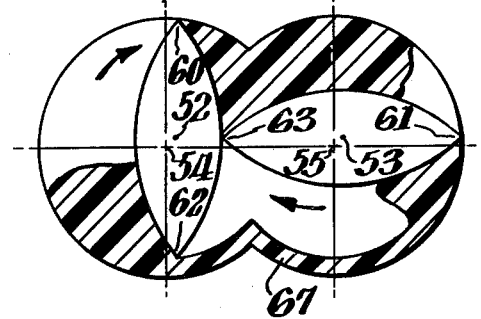
Figure 4F:
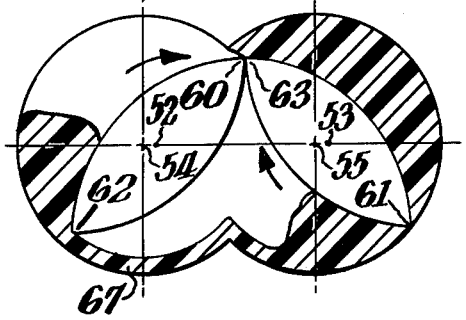
Figure 4G:
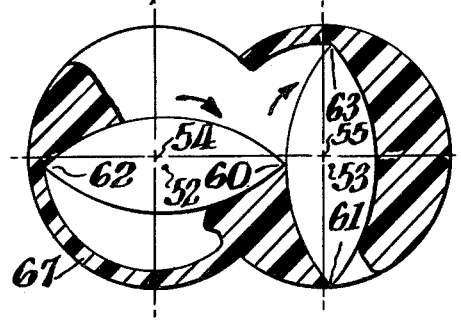
Figure 4H:
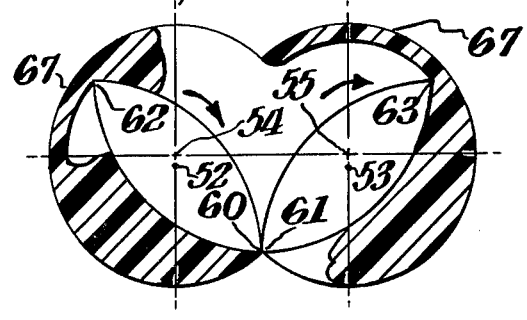

Referring in FIG. 1, there is shown a conventional three-tipped twin screw apparatus for which is depicted the action of the screws on the process material. It will be seen that each screw 1 has three equiangularly disposed tips 2 which each wipe their associated bores 3 and propel the viscous material 4 in process as wedges down the bore. The bores 3 intersect at points 5 and 6, so that screws 1 interact and wipe each other. Also, the screws each rotate in the same direction, clockwise in this instance, although rotation can equally well be counter-clockwise if desired, around the geometric centers 7 of the individual bores. While three-tipped screws are detailed here, the screws can optionally have any number of tips as desired.

It will be seen, from FIG. 1, that the plastic material is not spread as relatively thin uniform layers adjacent the bore walls but, rather, is moved through the apparatus as large gobs which do not present their internal recesses to the bore walls, so that uniform exposure of the viscous loading is not achieved vis-a-vis the bore walls, which are usually jacketed or heated by external heaters (not shown) for radial heat transfer.

Referring to FIGS. 2A-2F, there is shown a twin screw, three-tipped apparatus according to this invention which resembles that of FIG. 1 in all respects except that the screws incorporate "short" tips, 32, 36 and 33, 37, i.e., those not scraping the bore wall. To achieve this, the screws are machined to have longitudinally staged eccentric cross-sections with respect to the bores so that dots 20 denote the geometric centers, or centroids, of successive transverse sections of the screws whereas crosses 21 denote the respective centers of rotation (and also the bore centers). For this embodiment, each screw cross-section has a congruent shape and size relative to the other screw, and the geometric centers 20 (and 20′) are always a constant (and equal) distance from the centers of rotation 21 (and 21′).

This eccentricity of the screws spaces tips 32, 36 and 33, 37 equal distances radially of, typically, one to several millimeters from their associated bore walls, whereas remaining tips 22 and 23 clear the bore walls at close clearance, typically, 0.2–0.3 % of the barrel diameter, over their full lengths and thereby collect the viscous material as gobs 25, 26 which thereafter transfer from one screw to the other via the bore intersection region as the screw tips sequentially wipe adjacent profiles of their co-acting mates.

It is apparent, from FIGS. 2A–2F, that, for approximately 24° of screw rotation, the viscous material in process is spread over the bore surfaces as uniform thickness layers 34, 38 thereby facilitating both even heat and mass transfer. Although some collecting precedes it, the remaining 120° of screw rotation is consumed in consolidating the loading and transferring it from one screw to the other, after which a new spreading occurs, thereby exposing new viscous surfaces to both bore walls and screw surfaces.

As an aid in visualization, FIG. 3 shows the six apparatus longitudinally staged transverse planes A to F corresponding to the sections FIGS. 2A to 2F, respectively. Attention is particularly invited to the progressive helical displacements of the geometric centers, or centroids, 20 (and 20′) (shown in broken line representation) of each screw with respect to its central axis 21 (and 21′), which depicts regular helical courses around the central axes, the amplitudes of which helices determine the clearances between the spreading tips 32, 36 and 33, 37 and their associated bores.

FIG. 3 shows that screws 40 and 41 intermesh fully along line 44 and wipe each other completely. Similarly, tips 22 and 23 wipe the bore walls, whereas tips 32, 33, 36 and 37 do not.

FIGS. 4A–4H, inclusive, show schematically the progressive operation of a twin screw two-tipped design wherein (FIG. 4A) the geometric centers are 52 and 53 and the centers of rotation (and the bore centers) are 54 and 55, respectively. Here the transverse screw sections 50 and 51 are congruent, one tip of each, 60 for screw 50 and 61 for screw 51, abuts the bore walls and consolidates the viscous loading into gobs 64 and 66, whereas the other tip of each, 62 and 63, respectively, clears the walls and distributes the viscous loadings as layers 67 over the bore wall surfaces 65.

It is apparent that, with two-tipped screws, approximately 180 degrees of screw rotation is reserved for viscous loading spreading and the remaining 180° for viscous loading collection and transfer for typical apparatus loadings, i.e., in the range of about 20%–70% of the open bore cross-section.

In commercial practice screws are normally constructed with blunt tips, as shown in FIG. 5 for a twin screw, three-tipped design. Here the barrel diameter is denoted d, the eccentricity e (typically in the range of 0.01d to 0.10d) between the screw geometric center 83 (and 83′) and its axis of rotation 84 (and 84′) whereas the collecting tip is 80 (and 80′) and the two distributing tips are 81 (and 81′) and 82 (and 82′). The widths of the individual tips can typically be about 15°–20° of the screw cross-section peripheries. S. denotes the diameters of the tip (or crest)-circumscribing circles.

FIG. 6 shows the regular helical displacement of geometric center 83 with respect to the longitudinal axis of rotation 84, the helical curve amplitude being preselected to provide a desired clearance of tips 81 and 82 with respect to the associated bore.

Referring to FIGS. 7A–7G, representing a single screw of a twin screw three-tipped design apparatus, wherein the direction of rotation is clockwise (into the paper) for a left-hand thread as seen from the left-hand side of the drawing, screw 99 impels a non-uniform glob of viscous material 93 having a different composition interior 94 rightwards along bore 98. As screw tips 100 and 101 spread the viscous loading into a layer along the bore surface, the interior 94 gradually merges into the viscous glob exterior 93 until boundary 95 disappears, giving vastly improved homogeneity by the time of collection by collecting tip 90 during its advance between FIGS. 7D, 7E, 7F and 7G.

Figure 8:
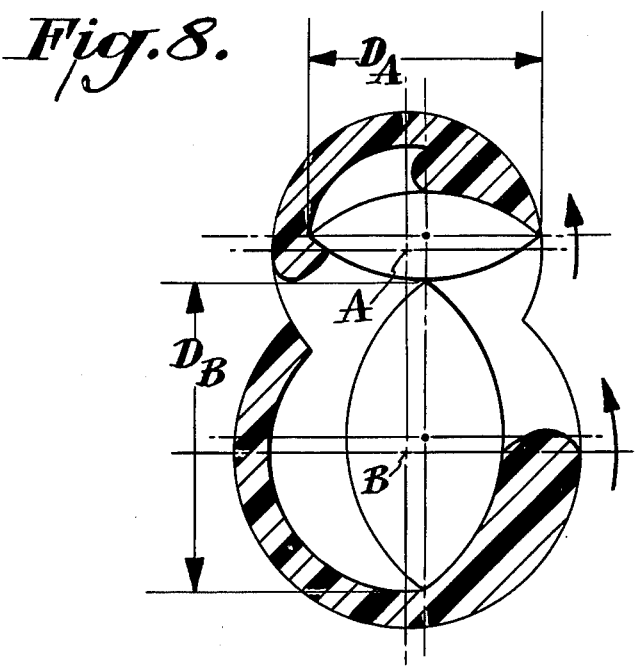

Referring to FIG. 8 there is shown a twin screw, two-tipped design of apparatus wherein different transverse section screws co-act, the upper screw having a tip-to-tip diameter $D_A$ and a center of rotation denoted A, whereas the corresponding features for the lower (larger) screw are denoted $D_B$ and B, respectively. A design of the FIG. 8 type distributes the viscous loading in different amounts over the associated bores, as is clearly shown in the drawing.

Figure 9:
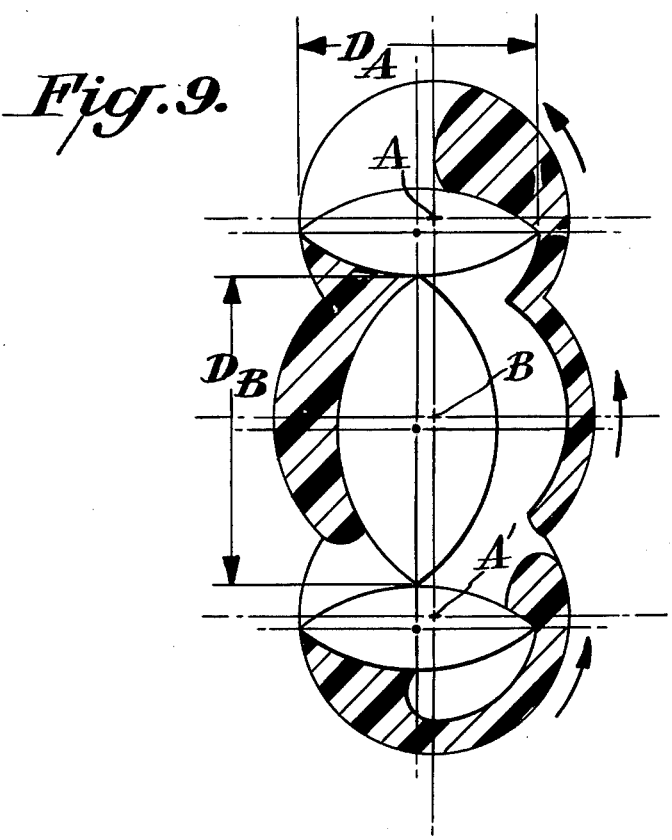

The design of FIG. 9 shows a three screw, two-tipped design wherein the two planetary screws, of equal diameters $D_A$, have congruent cross-sections whereas the central sun screw, of diameter $D_B$, is of relatively larger transverse cross-section. The respective centers of rotation are denoted A, A′ and B. Again, there is obtained a unique viscous material processing distribution throughout the coacting screws and their associated bores.

It can be seen from FIGS. 2–6, 8, and 9 that the process screws operate in parallel, intersecting, cylindrical bores in the processor's housing.

I claim:

1. A screw material processor embodying a housing, a multiplicity of parallel, intersecting, cylindrical bores in said housing and a multiplicity of fully intermeshed co-rotating in-phase screws, each operating in one of said bores, each screw being provided with equal numbers of threads, said threads comprising at least a first thread cut along a first helix in sliding contact with the bore of the processor housing with longitudinal axis coincident with the axis of rotation of said screw and at least one additional thread of reduced crest radius as compared with said first thread cut along a helical course concentric with said axis of rotation, said screws having longitudinally staged eccentric cross-sections the geometric centers of which lie on a helical curve having its central axis concentric with said axis of rotation, the amplitude of said helical curve being preselected to provide clearance of said additional thread with respect to said processor bore for spreading process material.

2. A twin screw material processor according to claim 1 wherein said screws are each provided with one said thread in sliding contact with said bore of said processor housing and two said additional threads spreading said process material over the inside surface of said processor bore.

3. A screw material processor according to claim 1 wherein said multiplicity of fully intermeshed co-rotating in-phase screws are of two different transverse cross-sectional areas.

4. A screw material processor according to claim 1 wherein said multiplicity of fully intermeshed co-rotating in-phase screws are substantially congruent in transverse cross-section.

5. A screw material processor according to claim 1 wherein one of said multiplicity of fully intermeshing co-rotating in-phase screws is centrally disposed and co-acting screws intermesh with said centrally disposed screw.

6. A screw material processor according to claim 5 wherein the circles circumscribing the thread crests of each said screw are all of equal diameters.

7. A screw material processor according to claim 5 wherein said centrally disposed screw has a given preselected diameter of circle circumscribing its thread crests whereas said co-acting screws each have equal preselected diameters of circles circumscribing their thread crests different from said circle circumscribing the thread crests of said centrally disposed screw.

* * * * *

UNITED STATES PATENT OFFICE
CERTIFICATE OF CORRECTION

PATENT NO. : 4,131,371
DATED : December 26, 1978
INVENTOR(S) : Daniel Gregory Tynan It is certified that error appears in the above-identified patent and that said Letters Patent are hereby corrected as shown below:

In Column 3, line 25, "24°" should be --240°--.

In Column 3, line 50, "screwtwo" should be --screw two--.

In Column 3, line 51, "centersare" should be --centers are--.

In Column 3, line 55, "abutsthe" should be --abuts the--.

In Column 4, line 8, "S.denotes" should be --S denotes--.

Signed and Sealed this

Twelfth Day of June 1979

[SEAL]

Attest:

RUTH C. MASON
Attesting Officer

DONALD W. BANNER
Commissioner of Patents and Trademarks